Patented Mar. 17, 1953

2,632,011

UNITED STATES PATENT OFFICE 2,632,011

TETRAHYDROPHTHALIC ACID COMPOUNDS

Harry de V. Finch, El Cerrito, and Seaver A. Ballard, Orinda, Calif., assignors to Shell Development Company, San Francisco, Calif., a corporation of Delaware No Drawing. Application March 20, 1948, Serial No. 16,148

9 Claims. (Cl. 260—346.6)

This invention relates to cyclic compounds and to a method for their production. More particularly, the invention pertains to certain novel cyclic compounds which comprise the 3-acyloxy-1,2,3,6-tetrahydrophthalic acid anhydrides, and to a method for their production which comprises reacting an open-chain, doubly unsaturated ester with a maleic anhydride, thereby forming a 3-acyloxy-1,2,3,6-tetrahydrophthalic acid anhydride. The invention further relates to the products which may be obtained by hydrolysis of the said phthalic acid anhydride and to a method for their production which comprises reacting the said phthalic acid anhydride with a suitable hydrolytic reagent.

This application is a continuation-in-part of our application No. 554,862, filed September 19, 1944, now abandoned.

The novel 3-acyloxy-1,2,3,6-tetrahydrophthalic acid anhydrides of the invention comprise the compounds of the general formula:

(1) 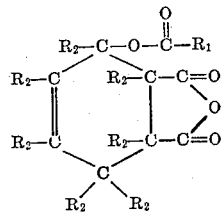

wherein $R_1$ is an organic radical derived from an organic acid and each $R_2$ is a non-interfering substituent, e. g. a hydrogen atom, an alkyl radical, a halogen atom, and the like.

The preferred organic radicals which $R_1$ may represent in the above-described formula for the novel 3-acyloxy-1,2,3,6-tetrahydrophthalic acid anhydrides are the hydrocarbon radicals and substituted hydrocarbon radicals. The hydrocarbon radicals may be cyclic or acyclic, saturated, unsaturated, or aromatic, such as the alkyl, alkenyl, aryl, alkaryl, aralkyl, aralkenyl, cyclo-alkyl and cyclo-alkenyl radicals. Examples of the hydrocarbon radicals which $R_1$ may represent are the straight and branch-chained alkyl radicals, such as methyl, ethyl, isopropyl, butyl, tert-butyl, pentyl, 2,3-diethylpentyl, heptyl, 2,4-dibutyl-octyl, decyl, dodecyl, 4,6,8-triethyldodecyl, tetradecyl, pentadecyl, 3-butyl-6-hexylhexadecyl, and the like; the straight and branch-chained alkenyl radicals, such as isopropenyl, 2-butenyl, 2,5-diethyl-4-hexenyl, octenyl, 2-butyl-6-heptenyl, 2-ethyl-6-heptenyl, 2-ethyl-5-pentyl-4-decenyl, 5-dodecenyl, pentadecenyl, and the like; the saturated and unsaturated cyclic radicals, such as cyclobutyl, cyclopentyl, cyclopentenyl, cyclohexenyl, 2-butyl-3-cyclopentyl, 2,5-diethylcyclohexyl, 2-pentyl-4-cyclohexenyl, and the like; aromatic radicals, such as phenyl, tolyl, 3,5-dimethylphenyl, and the like.

The substituted hydrocarbon radicals which $R_1$ may represent in the above-described general formula are the same as those hydrocarbon radicals described above for $R_1$ wherein at least one of the hydrogen atoms on the hydrocarbon radical has been replaced by a non-interfering inorganic element or radical, or by an organic radical. Such non-interfering radicals or elements may be exemplified by the halogen atoms, the hydroxyl group, ether, esters and ketone groups. Examples of the substituted straight and branch-chained alkyl radicals, such as 2-chlorobutyl, 3-acetoxy-4-ethylhexyl, 5-hydroxyoctyl, 3-bromo-5,5-diethyldecyl, and the like; the substituted straight and branch-chained alkenyl radicals, such as 3-bromo-3-butenyl, 4-butoxy-4-ethyl-5-hexenyl, 4-propionoxy-6-octenyl, 3-chloro-4-butyl-6-decenyl, and the like; the substituted saturated and unsaturated cyclic compounds, such as 3-chlorocyclobutyl, 2-hydroxy-4-cyclohexenyl, 2-bromo-3-butylcyclohexyl, 3-acetoxycyclopentyl and the like; and the substituted aromatic radicals, such as 3-bromophenyl, 2,3-dichlorotolyl, 2,5-dimethyl-6-hydroxylphenyl, and the like.

The preferred non-interfering substituent which $R_2$ may represent in the above-described Formula I are the members of the group comprising the hydrogen atom, a halogen atom, a —R radical, a —OR radical and a

radical (wherein R is an alkyl hydrocarbon).

The alkyl hydrocarbons which R may represent in the above-described group of non-interfering substituents ($R_2$) may be any of the straight or branch-chain alkyl radicals, such as methyl, ethyl, isopropyl, butyl, 2,3-diethylpentyl, 2,4,6-tributyloctyl, decyl dodecyl, 4,6-dibutyl-pentadecyl, nonadecyl and the like.

The preferred non-interfering substituents which $R_2$ may represent in Formula I may be exemplified by the following: as halogen atoms, bromine, and chlorine; as alkyl radicals, methyl, ethyl, butyl, tert-butyl, 2,3-diethylpentyl, dodecyl, nonadecyl and 4,6-dipentylpentadecyl radicals; as —OR radicals, methoxy, ethoxy, tert-butoxy, octoxy, dodecoxy, isopropoxy, pentadecoxy, and heptoxy radicals; and as

radicals, acetyl, propionyl, butyryl, octanoyl, decanoyl, and the like radicals.

The nomenclature used in describing the novel 3-acyloxy-1,2,3,6-tetrahydrophthalic acid anhydrides throughout the specification and appended claims may be illustrated by the following example:

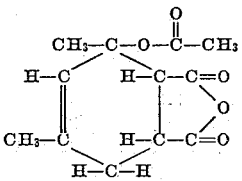

(3-acetoxy-3,5-dimethyl-1,2,3,6-tetrahydrophthalic acid anhydride)

This compound may also be described as 3-acetoxy-3,5-dimethyl-4-cyclohexen-1,2 - dicarboxylic acid anhydride.

Examples of the novel 3-acyloxy-1,2,3,6-tetrahydrophthalic acid anhydrides of the invention are:

1-butyl-3-acetoxy-1,2,3,6-tetrahydrophthalic acid anhydride 1,2 - diethyl - 3 - pentanoyl - 3 - pentanoxy- 1,2,3,6-tetrahydrophthalic acid anhydride.

3-(2'-hexenoxy)-3,4-diheptyl-1,2,3,6-tetrahydrophthalic acid anhydride

3 - benzoxy - 4,5 - dioctyl - 1,2,3,6 - tetrahydrophthalic acid anhydride

3 - cyclohexenoxy - 3,4,5 - triisopropyl - 1,2,3,6-tetrahydrophthalic acid anhydride 1-ethoxy-3-heptanoxy-1,2,3,6-tetrahydrophthalic acid anhydride 1,2 - ditert - butyl - 2 - (2',4' - hexadienoxy)- 1,2,3,6-tetrahydrophthalic acid anhydride 3-(2'-acetylbenzoxy)-3,6-didecyl-1,2,3,6-tetrahydrophthalic acid anhydride 3 - (2' - acetoxy - 4' - octenoxy) - 4 - (4''-methyloctyl)-1,2,3,6-tetrahydrophthalic acid anhydride 1 - (4'ethylpentyl) - 3 - cyclohexenoxy - 1,2,3,6-tetrahydrophthalic acid anhydride 1,4 - didodecyl - 3 - (2'chlorotoluoxy) - 1,2,3,6-tetrahydrophthalic acid anhydride 3 - octenoxy - 4,5 - dihydroxy - 1,2,3,6 - tetrahydrophthalic acid anhydride 3 - dodecenoxy - 4 - chloro - 1,2,3,6 - tetrahydrophthalic acid anhydride 3 - cyclopentenoxy - 4,5 - dipropionyl - 1,2,3,6-tetrahydrophthalic acid anhydride 3 - (2'pentoxybenzoxy) - 5 - pentadecyl - 1,2,3,6-tetrahydrophthalic acid anhydride 3 - (2',5',8' - tetradecatrienoxy) - 5 - octadecyl-1,2,3,6-tetrahydrophthalic acid anhydride 3 - (2' - chloro - 3' - cyclohexenoxy) - 3,5 - di-(2''butylhexyl)-1,2,3,6-tetrahydrophthalic acid anhydride 3 - toluoxy - 4,5 - ditert - butyl -1,2,3,6 - tetrahydrophthalic acid anhydride 1 - octyl - 4 - dodecyl - 3 - decenoxy - 1,2,3,6-tetrahydrophthalic acid anhydride 1 - ethyl - 4 - (2',5 - dibromooctenyl) - 3 - (2''octenoxy)-1,2,3,6-tetrahydrophthalic acid anhydride 3 - (2'phenylbenzoxy) - 4,5 - ditetradecyl-1,2,3,6-tetrahydrophthalic acid anhydride 3 - (2'phenylcyclohexyl) - 6 - isopropyl-1,2,3,6-tetrahydrophthalic acid anhydride A preferred group of the 3-acyloxy-1,2,3,6-tetrahydrophthalic acid anhydrides are those of the above described general Formula I wherein $R_1$ represents a hydrocarbon radical containing from 1 to 7 carbon atoms and each $R_2$ is a member of the group comprising a hydrogen atom and an alkyl radical containing from 1 to 10 carbon atoms.

These preferred 3-acyloxy-1,2,3,6-tetrahydrophthalic acid anhydrides may be represented by the following compounds:

1 - pentyl - 3 - acetoxy - 1,2,3,6 - tetrahydrophthalic acid anhydride 1,2 - dibutyl - 3 - hexanoxy - 1,2,3,6 - tetrahydrophthalic acid anhydride 3 - benzoxy - 4,5 - dodecyl - 1,2,3,6 - tetrahydrophthalic acid anhydride 3 - cyclohexanoxy - 3,4,5 - tritert - butyl - 1,2,3,6-tetrahydrophthalic acid anhydride 1 - ethyl - 3 - (2'4' - hexadienoxy) - 1,2,3,6 - tetrahydrophthalic acid anhydride 3 - toluoxy - 3,6 - dioctyl - 1,2,3,6 - tetrahydrophthalic acid anhydride 3 - cyclopentenoxy - 4,5 - dihexyl - 1,2,3,6 - tetrahydrophthalic acid anhydride 3 - (2'ethyl - 3 - cyclohexenoxy) - 3,5 - di(2',5'diethylhexyl)-1,2,3,6-tetrahydrophthalic acid anhydride 1 - octyl - 3 - decyl - 3 - heptenoxy - 1,2,3,6 - tetrahydrophthalic acid anhydride 1 - ethyl - 4 - (2,5 - dimethyloctyl) - 3 - (2''hexenoxy)1,2,3,6-tetrahydrophthalic acid anhydride 1 - heptyl - 3 - heptanoxy - 1,2,3,6 - tetrahydrophthalic acid anhydride A particularly valuable species of this preferred group of 3 - acyloxy - 1,2,3,6 - tetrahydrophthalic acid anhydrides, when considered from the standpoint of ease of preparation, utility, etc., comprise those members of the above-described group wherein $R_1$ is a hydrocarbon radical containing from 1 to 7 carbon atoms, the $R_2$'s on the No. 1, 2 and 4 carbon atoms are hydrogen atoms, the $R_2$ on the No. 3 carbon atom is an alkyl radical containing from 1 to 10 carbon atoms, and the remaining $R_2$'s are members of the group comprising a hydrogen atom and an alkyl radical containing from 1 to 10 carbon atoms.

This particularly valuable species may be represented by the following examples:

3 - butyl - 3 - acetoxy - 1,2,3,6 - tetrahydrophthalic acid anhydride

3 - pentyl - 3 - (2' - hexenoxy) - 1,2,3,6 - tetrahydrophthalic acid anhydride

3 - heptyl - 3 - benzoxy - 5,6 - dimethyl - 1,2,3,6-tetrahydrophthalic acid anhydride 3 - heptyl - 3 - cyclohexanoxy - 1,2,3,6 - tetrahydrophthalic acid anhydride 3 - decyl - 3 - acetoxy - 5 - tert - butyl - 1,2,3,6-tetrahydrophthalic acid anhydride 3 - isopropyl - 3 - propionoxy - 5 - tert - butyl-1,2,3,6-terterahydrophthalic acid anhydride 3 - hexyl - 3 - toluoxy - 6,5 - diheptyl - 1,2,3,6-tetrahydrophthalic acid anhydride The above-described novel 3-acyloxy-1,2,3,6-tetrahydrophthalic acid anhydrides may be produced by any suitable process. They are preferably prepared, however, from readily available starting materials in good yield by a novel method which essentially comprises reacting an open-chain unsaturated ester having a conjugated system of double bonds with a maleic anhydride. This reaction may be illustrated by the following equation showing the condensation of maleic anhydride with mesitlyl acetate:

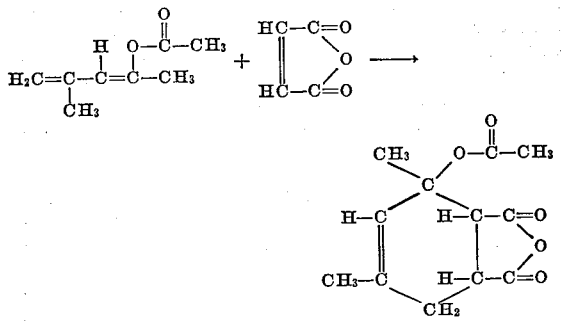

This type of condensation reaction may be carried out by contacting approximately equivalent amounts of the maleic anhydride and the open-chain doubly unsaturated ester at a temperature sufficiently high to effect the condensation within a reasonable time. In most instances, reaction temperatures of from about 30° C. to about 100° C. are suitable. Preferred temperatures are around 50° C.

The condensation reaction may, if desired, be carried out in the presence of a suitable solvent such as an aromatic hydrocarbon solvent, e. g. benzene or toluene. When the reaction is complete, the solvent, if any is present, may be removed and the adduct separated by crystallization or, in the case of the lower members of the series, by fractional distillation, preferably under diminished pressure.

The term maleic anhydride as used throughout the specification and claims is meant to include maleic anhydride and the substituted maleic anhydrides. The substituted maleic anhydrides comprise those maleic anhydrides wherein at least one of the hydrogen atoms joined to the carbon atoms containing the olefinic linkage of the maleic anhydride molecule is replaced by a non-interfering substituent. The substituents joined to the olefinic carbon atoms in the maleic anhydride molecule will determine the substituents to be attached to the Nos. 1 and 2 carbon atoms of novel 3-acyloxy-1,2,3,6-tetrahydrophthalic acid anhydrides of the invention and they, therefore, will be represented by the same components described above for the $R_2$ of the general formula (I). As stated above the preferred non-interfering substituents are the members of the group comprising the hydrogen atom, a halogen atom, a —R radical, a —OR radical and a $$\overset{O}{\underset{}{-\overset{\|}{C}R}}$$

radical (wherein R is an alkyl hydrocarbon as set forth hereinabove).

Examples of the substituted maleic anhydrides which may be utilized in the reaction are methyl maleic anhydride, dibutyl maleic anhydride, methyl pentyl maleic anhydride, dichloro maleic anhydride, dibutoxy maleic anhydride, ditertbutyl maleic anhydride, diacetyl maleic anhydride, didecanoyl maleic anhydride, heptoxy maleic anhydride, heptyl chloro maleic anhydride and the like.

The maleic anhydrides to be employed for the production of the preferred group of tetrahydrophthalic acid anhydrides are the members of the group comprising maleic anhydride and the substituted maleic anhydrides wherein at least one of the hydrogen atoms joined to the carbon atoms bearing the olefinic linkage has been replaced by an alkyl group containing from 1 to 10 carbon atoms.

The open-chain, unsaturated esters possessing the conjugated system of double bonds which may be utilized in the reaction to condense with the maleic anhydride to form the novel tetrahydrophthalic acid anhydrides may be represented by the general formula:

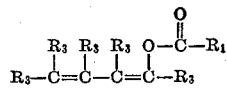

wherein $R_1$ is an organic radical derived from an organic acid and each $R_3$ is a non-interfering substituent. The $R_1$ in the above formula of the unsaturated ester will determine the $R_1$ to be attached to the ester group on the number 3 carbon atom of the novel 3-acyloxy-1,2,3,6-tetrahydrophthalic acid anhydrides so it, therefore, will be represented by the same substituents as described above for the $R_1$ of the Formula I. The $R_3$'s in the above formula will determine the $R_2$'s to be attached to the number 3 to 6 carbon atoms of the novel 3-acyloxy-1,2,3,6-tetrahydrophthalic acid anhydrides and they will be represented by the same substituents as described above for the $R_2$'s of the Formula I.

Examples of the open-chain unsaturated esters which may be utilized in the process are: 1-propionoxy 1,3-butadiene, 1-benzoxy 2,3-dibutyl 1,3-butadiene, 2-hexenoxy 5-acetyl 2,4-heptadiene, 3-cyclohexenoxy 4,5-dichloro 3,5-octadiene, 4-cyclopentenoxy 5-octyl 4,6-decadiene, and the like.

The open-chain, unsaturated esters to be employed for the production of the preferred group of tetrahydrophthalic acid anhydrides are those members of the above-described formula wherein $R_1$ is a hydrocarbon radical containing from 1 to 7 carbon atoms and each $R_3$ is a member of the group comprising a hydrogen atom and an alkyl radical containing from 1 to 10 carbon atoms.

The open-chain, unsaturated esters to be employed for the production of the particularly valuable species of the tetrahydrophthalic acid anhydrides are those members of the above-described formula wherein $R_1$ is a hydrocarbon radical containing from 1 to 7 carbon atoms, the $R_3$ on the No. 1 carbon atom is an alkyl radical containing from 1 to 10 carbon atoms, the $R_3$ on the No. 2 and 4 carbon atoms are hydrogen atoms and the $R_3$ on the No. 3 and the remaining $R_3$ on the No. 4 carbon atom are members of the group comprising a hydrogen atom and an alkyl radical containing from 1 to 10 carbon atoms.

The above-described open-chain, doubly unsaturated esters may be prepared by any suitable method. A preferred method for preparing a particular group of the unsaturated esters is by reacting a ketone with an alpha, beta-unsaturated ketone which is capable of existing in an enol form. The reactions which take place in this method of preparation may be illustrated below by the equations showing the reactions of mesityl oxide with ketones:

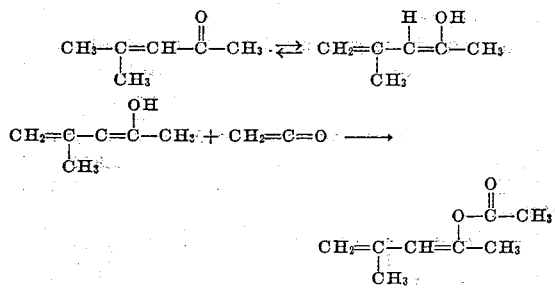

A variety of alpha,beta-unsaturated ketones may be used as starting materials for the above-described synthesis. Suitable ketones comprise in general those wherein the double bond is between the carbon atoms which are in the alpha and beta positions relative to the carbonyl group and wherein there is also substituted upon one of the alpha carbon atoms a hydrogen atom which is capable of migrating to the oxygen atom of the said carbonyl group, thereby forming the enol form of the ketone. It has been observed that before such a structural shift will readily occur, it is desirable that the two alpha carbon atoms bearing a total of at least three hydrogen atoms. Suitable alpha,beta-unsaturated ketones are, therefore, mesityl oxide, 4-octen-3-one, 4-methyl 3-hexen-2-one, 4-butyl 3-hexen-2-one, 4-tert-butyl 3-octen-2-one, 6-hexeyl-5-decen-4-one, 6-isooctyl 5-decen-4-one 4-chloro 3-octen-2-one, 4-acetoxy 3-dodecen-2-one, 4-bromo-7-methyloxy 3-octen-2-one, 7-heptyl 6-dodecen-5-one, 4-isopropyl 7-hydroxy 3-octen-2-one, 8-tert-butyl 5-decen-4-one, 4-tert-butyl 3-hexen-2-one, 4-propionoxy 3-penten-2-one, 6-chloro 5-decen-4-one, 4-(2′,5′,6′-triethyloctyl) 3-hepten-2-one, 6-heptanoxy 5-dodecen-4-one, 4-bromo-3-hexene-2-one, 4-butoxy 3-hepten-2-one and the like.

Substituted ketenes may be used in place of ketene itself. Examples of such substituted ketenes are ethyl ketene, dibutyl ketene, pentenyl ketene, phenyl ketene, cyclohexyl ketene, cyclopentenyl ketene, tolyl ketene, butenyl ketene, and the like.

The reaction between the enol form and the ketenes may usually be effected by simply contacting the reactants at a reaction temperature and in the presence of a catalytic substance. Suitable catalytic substances for use in the synthesis comprise such acids as sulfuric acid, phosphoric acid, and the like. These may be employed in relatively small amounts, i. e. in amounts of about 1% or less, based on the amount of ketene used.

The reaction temperature to be used is determined by the nature of the ketone and ketene used as starting materials. In most cases, however, reaction temperatures of between about 50° C. and about 100° C., preferably about 75° C. may be used. Higher temperatures may be employed in certain cases, however, as where the reaction is carried out at superatmospheric pressure.

Although the synthesis may usually be satisfactorily carried out at atmosphereic pressure, it may be desirable or necessary in certain cases to effect the combination of the ketene and the alpha,beta-unsaturated ketone at superatmospheric pressures, i. e. pressures of up to about 1000 p. s. i.

It usually suffices to contact the alpha,beta-unsaturated ketone and the ketene in the presence of an acid catalyst without the introduction of another component into the reaction mixture. If desired, however, a suitable solvent or diluent material such as a hydrocarbon solvent may be admixed with the reactants in any desired ratio. Use of such a solvent or diluent material may be desirable, for example, when ketones of relatively high molecular weight and viscous nature are being used.

The reaction time is likewise variable depending upon the nature of the starting materials and the operating conditions. Operating times of up to about 5 hours, preferably about 3 hours, are usually sufficient to effect substantial conversions of the reactants to the desired unsaturated ester. When the reaction is complete the unsaturated ester product may be separated from unreacted starting materials as well as from any by-products which may be present by any suitable manner, as by fractional distillation. It may be necessary in the case of high-boiling products to carry out this distillation step under reduced pressures, for example, at a pressure of between about 2 mm. and about 10 mm.

In the case of certain alpha,beta-unsaturated ketones, i. e. in the case of those ketones which enolize comparatively readily, it may be possible to carry out the reaction in a continuous manner. This may be done, for example, by continuously contacting a quantity of an alpha,beta-unsaturated ketone and ketene with an acid condensing agent at a suitably elevated temperature, continuously separating the unsaturated ester product from the unreacted ketone, and recycling the latter into further contact with a ketene and an acid condensing agent.

A preferred procedure for preparing the novel compounds of the invention may be illustrated by the following method showing the production of 3,5 - dimethyl - 3 - acetoxy - 1,2,3,6 - tetrahydrophthalic acid anhydride from mesityl oxide and ketene. In accordance with this embodiment gaseous ketene prepared, for example, from acetone in a standard ketene generator may be passed into a quantity of mesityl oxide which contains a trace of sulfuric acid at a temperature of about 75° C. After a reaction time of about 3 hours the product may be fractionally distilled under reduced pressure to separate the 4-methyl-1,3-pentadiene-2-ol acetate. The ester prepared in this fashion may then be mixed with an approximately equivalent amount of maleic anhydride and the mixture maintained at a reaction temperature of about 50° C. for about one-half hour. During this time the white crystalline adduct separates as a solid and may be filtered off, purified and dried.

As set forth hereinabove the present invention also embraces within its scope the products resulting from the hydrolysis of the above-described novel 3 - acyloxy - 1,2,3,6 - tetrahydrophthalic acid anhydride. As is apparent from a consideration of the structure of the compounds of this type, at least three different hydrolytic products may be formed by the hydrolysis of the novel acid anhydrides, the types of hydrolytic product formed being dependent upon the character of the hydrolytic reagent employed and the conditions of hydrolysis, especially the time of contact with the hydrolytic reagent and the temperature of the reaction.

The first group of hydrolytic products to be produced from the novel 3-acyloxy-1,2,3,6-tetrahydrophthalic acid anhydrides are the 3-acyloxy- 1,2,3,6-tetrahydrophthalic acids. This group of compounds may be represented by the following general formula:

(II)
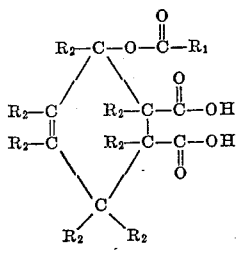

wherein $R_1$ is an organic radical derived from an organic acid and each $R_2$ is a non-interfering substituent e. g. a hydrogen atom, an alkyl radical, a halogen atom and the like.

As these novel 3-acyloxy-1,2,3,6-tetrahydrophthalic acids are to be derived directly from the novel tetrahydrophthalic acid anhydrides the substituents assigned to $R_1$ and $R_2$ of the above formula will be the same as described above for the $R_1$ and $R_2$ of formula (I) above, i. e. the preferred organic radicals to be represented by $R_1$ will be the hydrocarbon radicals and substituted hydrocarbon radicals and the preferred noninterfering substituents to be represented by $R_2$ will be the members of the group comprising the hydrogen atom, a halogen atom —R radical, a —OR radical, and a

radical (wherein R is an alkyl hydrocarbon).

Examples of the novel 3-acyloxy-1,2,3,6-tetrahydrophthalic acids of the invention are:

1,2 - diethyl - 3 - pentanoxy - 1,2,3,6 - tetrahydrophthalic acid
3 - (2' - hexenoxy) - 3,4 - diheptyl - 1,2,3,6 - tetrahydrophthalic acid
3 - benzoxy - 4,5 - dioctyl - 1,2,3,6 - terahydrophthalic acid
3 - cyclohexanoxy - 3,4,5 - triisopropyl - 1,2,3,6 - tetrahydrophthalic acid
1 - ethoxy - 3 - heptanoxy - 1,2,3,6 - terahydrophthalic acid
3 - dodecenoxy - 4 chlor - 1,2,3,6 - tetrahydrophthalic acid
3 - octenoxy - 4,5 - didecyl - 1,2,3,6 - tetrahydrophthalic acid The preferred group of the novel 3-acyloxy-1,2,3,6-tetrahydrophthalic acids will be those derived from the preferred group of the novel 3-acyloxy-1,2,3,6-tetrahydrophthalic acid anhydrides, i. e. those wherein $R_1$ is a hydrocarbon radical containing from 1 to 7 carbon atoms and each $R_2$ is a member of the group comprising a hydrogen atom an alkyl radical containing from 1 to 10 carbon atoms.

Examples of the preferred group of 3-acyloxy-1,2,3,6-tetrahydrophthalic acids are:

1 - pentyl-3-acetoxy - 1,2,3,6 - tetrahydrophthalic acid
3-benzoxy-4,5-didecyl-1,2,3,6-tetrahydrophthalic acid
3-cyclohexanoxy-2,3,5-tritert-butyl-1,2,3,6-tetrahydrophthalic acid
1 - ethyl - 3 - (2',4'- hexadienoxy) - 1,2,3,6 - tetrahydrophthalic acid
3-toluoxy-3,6-dioctyl-1,2,3,6-tetrahydrophthalic acid A particularly valuable species of the above-described tetrahydrophthalic acids are those derived from the novel 3-acyloxy-1,2,3,6-tetrahydrophthalic acid anhydrides wherein $R_1$ is a hydrocarbon radical containing from 1 to 7 carbon atoms, the $R_2$'s on the No. 1, 2 and 4 carbon atoms are hydrogen atoms, the $R_2$ on the No. 3 carbon atom is an alkyl radical containing from 1 to 10 carbon atoms, and the remaining $R_2$'s are members of the group comprising a hydrogen atom, and an alkyl radical containing from 1 to 10 carbon atoms.

Examples of this particularly valuable species of the tetrahydrophthalic acids are:

3-butyl - 3 - acetoxy - 1,2,3,6 - tetrahydrophthalic acid
3 - pentyl - 3 - (2'-hexenoxy) -1,2,3,6-tetrahydrophthalic acid
3-heptyl-3-benzoxy-5,6-dimethyl-1,2,3,6-tetrahydrophthalic acid
3 - heptyl - 3 - cyclohexenoxy-1,2,3,6-tetrahydrophthalic acid The above-described 3-acyloxy-1,2,3,6-tetrahydrophthalic acids are produced by treating the corresponding 3 - acyloxy - 1,2,3,6 - tetrahydrophthalic acid anhydride to hydrolysis which is sufficiently mild to effect the conversion of the anhydride group to two carboxylic acid groupings without effecting the hydrolysis of the ester group substituted upon the number 3 carbon atom or any of the other substituents, such as the —OR and

radicals which may be substituted on the ring carbon atoms. The hydrolysis may in some cases be carried out, for example, using water alone or weak aqueous solutions of acids or of bases such as sodium carbonate, potassium hydroxide, potassium carbonate, etc., using very short reaction times, e. g., reaction times of less than about 15 minutes at room temperature or temperatures which are but slightly in excess of room temperature, i. e. temperatures of about 30° C. to 40° C. The dicarboxylic acid product may be separated from the hydrolytic mixture by any suitable means as by crystallization of either the free acid or of its metal salt, e. g. its sodium salt.

The second group of hydrolytic products to be derived from the novel 3-acyloxy-1,2,3,6-tetrahydrophthalic acid anhydrides are the 3-hydroxy-1,2,3,6-tetrahydrophthalic acids. This group of compounds may be represented by the following general formula:

(III)
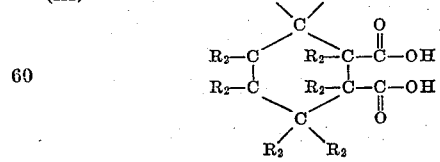

wherein $R_2$ represents a non-interfering substituent, e. g. a hydrogen atom, an alkyl radical, a halogen atom, and the like.

As these novel 3-hydroxy-1,2,3,6-tetrahydrophthalic acids are to be derived directly from the novel tetrahydrophthalic acid anhydrides or the novel tetrahydrophthalic acids the substituents assigned to $R_2$ of the above-described formula will be the same as described above for the $R_2$ of the Formula I and Formula II, i. e. the preferred substituents to be represented by $R_2$ will be the members of the group comprising the hydrogen atom, a halogen atom, a —R radical, a —OR radical, and a

—CR radical (wherein R is an alkyl hydrocarbon).

Examples of the novel 3-hydroxy-1,2,3,6-tetrahydrophthalic acids of the invention are:

1 - butyl-3-hydroxy - 1,2,3,6 - tetrahydrophthalic acid 1,2 - dihexyl - 3 - hydroxy - 1,2,3,6-tetrahydrophthalic acid 3-hydroxy - 4,5 - diheptoxy - 1,2,3,6 - tetrahydrophthalic acid 3-hydroxy - 5 - propionoxy - 1,2,3,6 - tetrahydrophthalic acid 1,2-dichloro-3-hydroxy-1,2,3,6-tetrahydrophthalic acid The preferred group of the novel 3-hydroxy-1,2,3,6-tetrahydrophthalic acids will be those derived from the preferred group of the novel 3-acyloxy-1,2,3,6-tetrahydrophthalic acid anhydrides or acids, i. e. those wherein R2 is a member of the group comprising a hydrogen atom, and an alkyl radical containing from 1 to 10 carbon atoms.

Examples of the preferred group of 3-hydroxy-1,2,3,6-tetrahydrophthalic acids are:

1-pentyl - 3 - hydroxy-1,2,3,6-tetrahydrophthalic acid 3-hydroxy-4,5-didecyl-1,2,3,6-tetrahydrophthalic acid 3 - hydroxy - 4,5 - diisopropyl-1,2,3,6-tetrahydrophthalic acid 3-hydroxy - 5 - pentyl-1,2,3,6-tetrahydrophthalic acid 3 - hydroxy - 4 - tert. - butyl - 1,2,3,6 - tetrahydrophthalic acid A particularly valuable species of the above-described 3-hydroxy-1,2,3,6-tetrahydrophthalic acids are those derived from the novel 3-acyloxy-1,2,3,6-tetrahydrophthalic acid anhydrides or acids wherein the R2's on the No. 1, 2 and 4 carbon atoms are hydrogen atoms, the R2 on the No. 3 carbon atom is an alkyl radical containing from 1 to 10 carbon atoms, and the remaining R2 are members of the group comprising a hydrogen atom, and an alkyl radical containing from 1 to 10 carbon atoms.

Examples of this particularly valuable species of the 3-hydroxy-1,2,3,6-tetrahydrophthalic acids are:

3-hydroxy-1,2,3,6-tetrahydrophthalic acid 3-hydroxy-5,6-dioctyl-1,2,3,6-tetrahydrophthalic acid 3-hydroxy-5,6-dibutyl-1,2,3,6-tetrahydrophthalic acid 2 - octyl - 3 - hydroxy-5-decyl-1,2,3,6-tetrahydrophthalic acid 2-decyl - 3 - hydroxy-6-octyl - 1,2,3,6-tetrahydrophthalic acid The above-described 3-hydroxy-1,2,3,6-tetrahydrophthalic acids are produced from the corresponding 3-acyloxy-1,2,3,6 - tetrahydrophthalic acid anhydride or acid by treating the said anhydride or acid to somewhat more vigorous hydrolytic conditions than those described above for the production of the acids, so that the anhydride group is hydrolyzed to two carboxylic groups and the ester group is hydrolyzed to a hydroxyl group. The hydrolysis may be carried out by use of a suitable hydrolytic reagent, such as water, aqueous solutions of alkalies such as sodium hydroxide, sodium carbonate, potassium carbonate or of dilute acids such as dilute hydrochloric acid, dilute sulfuric acid and the like. When these hydrolytic reagents are employed the desired hydrolytic action may be obtained by maintaining the reaction mixture at slightly elevated temperatures, e. g. temperatures of between about 40° C. to about 60° C., until the reaction is complete. The hydroxy-tetrahydrophthalic acid product may then be separated from the reaction mixture in the form of its sodium salt or in the form of the free acid substantially as described hereinabove.

A preferred procedure for carrying out this hydrolytic reaction may be illustrated by the method which may be used for the production of 3-hydroxy - 5 - methyl - 1,2,3,6 - tetrahydrophthalic acid from 3-acetoxy-5-methyl-1,2,3,6-tetrahydrophthalic acid anhydride. In accordance with this embodiment the said 3-acetoxy-5-methyl-1,2,3,6-tetrahydrophthalic acid anhydride may be mixed with a suitable hydrolytic reagent, e. g. an aqueous solution of sodium carbonate containing about 1% of sodium carbonate and the resulting mixture heated to a temperature of about 40° C. After a reaction time of about ½ hour the disodium salt of 3-hydroxy-5-methyl-1,2,3,6-tetrahydrophthalic acid may be separated from the reaction mixture or the mixture may be neutralized with an acid, e. g. hydrochloric acid, thereby causing the precipitation of the desired tetrahydrophthalic acid derivative.

The 3 - hydroxy - 1,2,3,6 - tetrahydrophthalic acids wherein there is an alkyl group substituted on the No. 3 carbon atom were not included in the above-described group as their preparation is difficult and in most cases impossible to accomplish. This is because the alcohols of this type i. e. a tertiary alcohol are readily dehydrated with the formation of an olefinic linkage. A further factor favoring such dehydration is to be found in the fact that the hydroxyl group is substituted upon a carbon atom which is in the beta position relative to one of the carboxyl groups and as is well known the beta-hydroxy-carboxylic acids readily lose water to form unsaturated acids. In the case of the novel compounds of the invention when such dehydration takes place a new double bond is formed within the ring, thereby forming a 1,2-dihydrophthalic acid. The novel 3-acyloxy-1,2,3,6-tetrahydrophthalic acid anhydrides of the invention or either of the hereinabove described hydrolytic products may, therefore, be converted to novel hydrolytic products which comprise the 1,2-dihydrophthalic acids. These compounds may be prepared by the exhaustive hydrolysis of the 3-acyloxy-1,2,3,6-tetrahydrophthalic acid anhydrides of the invention or any of the afore-said intermediate hydrolytic products, the hydrolysis being carried out under such conditions that the ester group is hydrolyzed to a free hydroxyl group, the said free hydroxyl group is removed from the ring by a secondary dehydration reaction, thereby resulting in the formation of a second olefinic linkage, and the anhydride group is hydrolyzed to form two carboxyl groups.

The group of 1,2-dihydrophthalic acids embraced by the invention may be represented by the following general formula:

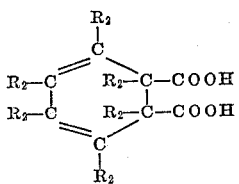

wherein $R_2$ is a non-interfering substituent, e. g. a hydrogen atom, an alkyl radical, a halogen atom, and the like.

As these novel 1,2-dihydrophthalic acids are to be derived directly from the novel tetrahydrophthalic acid anhydrides or any of the aforesaid intermediate hydrolytic products the substituents assigned to $R_2$ of the above-described formula may be the same as those described above for the $R_2$ of the Formulae I, II, and III, i. e. the preferred substituents to be represented by $R_2$ may be members of the group comprising the hydrogen atom, a halogen atom, a —R radical, a —OR radical, and a

radical (wherein R is an alkyl hydrocarbon).

Examples of the novel 1,2-dihydrophthalic acids of the invention are:

1-butyl-3-pentyl-1,2-dihydrophthalic acid
1,2-dimethyl-3-octyl-1,2-dihydrophthalic acid
3-heptyl-4,5-diacetyl-1,2-dihydrophthalic acid
1-isobutyl-3-dodecyl-1,2-dihydrophthalic acid
3-octyl-5-propionoxyl-1,2-dihydrophthalic acid
3-butyl-5-chloro-1,2-dihydrophthalic acid The preferred group of the novel 1,2-dihydrophthalic acids of the invention will be those derived from the preferred group of the novel 3-acyloxy-1,2,3,6-tetrahydrophthalic acid anhydrides and the aforesaid intermediate hydrolysis products, i. e. those wherein $R_2$ is a member of the group comprising a hydrogen atom and an alkyl radical containing from 1 to 10 carbon atoms.

Examples of the preferred group of 1,2-dihydrophthalic acids are:

1,2-dihexyl-3-decyl-1,2-dihydrophthalic acid
3-isobutyl-5-octyl-1,2-dihydrophthalic acid
1-pentyl-3-hexyl-1,2-dihydrophthalic acid
3-isopropyl-4,5-ditert-butyl-1,2 - dihydrophthalic acid A particularly valuable species of the above-described 1,2,3,6-tetrahydrophthalic acids are those of the above-described general formula wherein the $R_2$'s on the No. 1, 2 and 4 carbon atoms are hydrogen atoms, the $R_2$ on the No. 3 carbon atom is an alkyl radical containing from 1 to 10 carbon atoms, and the remaining $R_2$'s are the members of the group comprising a hydrogen atom and alkyl radical containing from 1 to 10 carbon atoms.

Examples of this particularly valuable species of the 1,2-dihydrophthalic acids are:

3-pentyl-5,6-dimethyl-1,2-dihydrophthalic acid
3-octyl-3-isopropyl-1,2,-dihydrophthalic acid
3-heptyl-5-tert.-butyl-1,2-dihydrophthalic acid
3-decyl-5,6-dioctyl-1,2,-dihydrophthalic acid The above-described 1,2,-dihydrophthalic acids are prepared from the 3-acyloxy-1,2,3,6-tetrahydrophthalic acid anhydrides or acids covered by Formulae I, II, and III by treating the said anhydride or intermediate hydrolysis products to such conditions that the ester group, if present, is hydrolyzed to a hydroxyl group, the hydroxyl group is removed by dehydration and the anhydride group, if present, is hydrolyzed to two carboxyl groups. This hydrolytic process may be carried out by using any of the hydrolytic reagents mentioned hereinabove, i. e. water, aqueous solutions of bases or aqueous solutions of acids, at an elevated temperature for a reaction time which is sufficiently long to effect the desired hydrolysis. A preferred procedure may be represented by that which may be employed to convert 3-actoxy-3,5-dimethyl-1,2,3,6-tetrahydrophthalic acid anhydride to 3,5-dimethyl-1-2-dihydrophthalic acid. In this embodiment the 3 - acetoxy - 3,5 - dimethyl - 1,2,3,6 - tetrahydrophthalic acid anhydride is reacted with an excess of an aqueous solution of 1 N sodium hydroxide, using a solvent such as dioxane if desired. The reaction may be carried out at any suitable temperature, preferably a temperature which is substantially the boiling temperature of the hydrolytic mixture. When the hydrolysis is complete the reaction mixture is neutralized with an acid, e. g. a dilute aqueous solution of hydrochloric acid and the desired 3,5-dimethyl-1,2-dihydrophthalic acid extracted with a suitable solvent such as isopropyl ether. The resulting solution of product in solvent may then be dried and evaporated in order to obtain the dihydrophthalic acid product.

To illustrate the manner in which the invention may be carried out the following examples are given. It is to be understood, however, that the examples are given for the purpose of illustration only and should not be regarded as limiting the invention in any way.

*Example I*

Mesityl acetate was prepared by passing ketene into a quantity of mesityl oxide which contained a trace of sulfuric acid. The temperature of the reaction mixture was maintained at about 75° C. during this addition. When the reaction was complete, i. e. after ketene had been added for from 3 to 4 hours, the product was fractionally distilled to separate the mesityl acetate which boiled at about 58° C. at 10 mm.

About 3 parts by weight of mesityl acetate prepared in this fashion was then mixed with about 2 parts of maleic anhydride and the resulting mixture heated at about 50° C. for about 20 minutes. The white crystalline product which separated was removed by filtration and purified by washing with a solvent and drying. The 3 - acetoxy - 3,5 - dimethyl - 1,2,3,6 - tetrahydrophthalic acid anhydride prepared in this fashion melted at 283° C. It analyzed 60.5% C. (calculated, 60.4%). Equivalent weight 78 (theory 79).

*Example II*

Using the method outline in Example I, 3 - methyl - 3 - acetoxy - 1,2,3,6 - tetrahydrophthalic acid anhydride is prepared from methyl n-propenyl ketone, ketene, and maleic anhydride.

3 - benzoxy - 1,2,3,6 - tetrahydrophthalic acid anhydride is prepared by heating maleic anhydride with 1-benzoxy-1,3-butadiene at a temperature between 50° C. and 100° C.

In like manner are prepared the following anhydrides: 1 - butyl - 3 - pentanoxy - 1,2,3,6-tetrahydrophthalic acid anhydrides from butyl maleic anhydride and 1 - pentanoxy - 1,3 - butadiene; 1,2 - dihexyl - 3 - cyclohexanoxy - 1,2,3,6- tetrahydrophthalic acid anhydride from dihexyl maleic anhydride and 1-cyclohexanoxy-1,3-butadiene; 1 - isopropyl - 3 - benzoxy - 1,2,3,6 - tetrahydrophthalic acid anhydride from isopropyl maleic anhydride and 1-benzoxy-1,3-butadiene; 1,2 - dichloro - 3 - cyclopentenoxy - 1,2,3,6 - tetrahydrophthalic acid from dichloro maleic anhydride and 1 - cyclopentenoxy - 1,3 - butadiene; 3 - octyl - 3 - hexenoxy - 1,2,3,6 - tetrahydrophthalic acid anhydride from maleic anhydride and 1 - octyl - 1 - hexenoxy - 1,3 - butadiene; 3 - octenoxy - 4,5 - dihydroxy - 1,2,3,6 - tetrahydrophthalic acid from dihydroxy maleic anhydride and 1-octenoxy-1,3-butadiene; 3-phenyl-3 - heptenoxy - 5 - phenyl - 1,2,3,6 - tetrahydrophthalic acid anhydride from maleic anhydride and 1,3 - diphenyl - 1 - heptenoxy - 1,3 - butadiene; 1,2,3,4 - tetraethyl - 3 - (2'phenylbenzoxy) - 1,2,3,6 - tetrahydophthalic acid anhydride from diethyl maleic anhydride and 1-ethyl-1 (2'phenylbenzoxy) - 2 - ethyl - 1,3 - butadiene; 1 - ethoxy - 4 - butoxy - 3 - isopropanoxy - 1,2,3,6 - tetrahydrophthalic acid anhydride from ethoxy maleic anhydride and 1-isopropanoxy-2-butoxy - 1,3 - butadiene; and 3 - toluoxy - 3,6 - didecyl-1,2,3,6-tetrahydrophthalic acid anhydride from maleic anhydride and 1 - toluoxy - 1,4 - didecyl-1,3-butadiene.

*Example III*

The sodium salt of 3-acetoxy-5-methyl-1,2,3,6-tetrahydrophthalic acid is prepared from 3-acetoxy - 5 - methyl - 1,2,3,6 - tetrahydrophthalic acid anhydride synthesized as described in Example I by reaction with a hydrolytic reagent comprising a dilute aqueous solution of sodium carbonate at a temperature of about 25° C. for a reaction time of about 15 minutes. The free acid may be prepared from its sodium salt by reaction with an approximately equivalent amount of a dilute mineral acid such as hydrochloric acid.

In like manner are produced 3-toluoxy-3,6-didecyl - 1,2,3,6 - tetrahydrophthalic acid from 3 - toluoxy - 3,6 - didecyl - 1,2,3,6 - tetrahydrophthalic acid anhydride; 1-ethoxy-4-butoxy-3-isopropanoxy - 1,2,3,6 - tetrahydrophthalic acid from its corresponding anhydrides; 1,2,3,4-tetraethyl - 3 - (2'phenylbenzoxy) - 1,2,3,6 - tetrahydrophthalic acid from its anhydride; 3-octyl-3-hexenoxy - 1,2,3,6 - tetrahydrophthalic acid from its anhydride; 1 - isopropyl - 3 - benzoxy - 1,2,3,6 - tetrahydrophthalic acid from its anhydride; and 1,2 - dichloro - 3 - cyclopentenoxy - 1,2,3,6 - tetrahydrophthalic acid from its anhydride.

*Example IV*

Hydroxy - 5 - methyl - 1,2,3,6 - tetrahydrophthalic acid is prepared by treating 3-acetoxy-5-methyl-1,2,3,6-tetrahydrophthalic acid anhydride with a 1% aqueous solution of sodium carbonate at 40° C. for about ½ hour. The disodium salt of the 3 - hydroxy - 5 - methyl - 1,2,3,6 - tetrahydrophthalic acid is then separated from the reaction mixture.

3 - hydroxy-1,2,3,6-tetrahydrophthalic acid is prepared by reacting a 3-acetoxy-1,2,3,6-tetrahydrophthalic acid with a hydrolytic reagent comprising a dilute aqueous sodium carbonate solution thereby forming the disodium salt of a 3 - hydroxy-1,2,3,6-tetrahydrophthalic acid, and reacting the said salt with a dilute mineral acid, thereby forming the desired tetrahydrophthalic acid derivative.

In like manner are prepared 3-hydroxy-3,6-didecyl-1,2,3,6-tetrahydrophthalic anhydride; acid from 3 - toluoxy - 3,6-didecyl-1,2,3,6-tetrahydrophthalic acid anhydride; 3-hydroxy-5,6-dioctyl-1,2,3,6-tetrahydrophthalic acid from 3-acetoxy-5,6 - dioctyl-1,2,3,6-tetrahydrophthalic acid anhydride; 1,2 - dihexyl-3-hydroxy-1,2,3,6-tetrahydrophthalic acid from 1,2-dihexyl-3-benzoxy-1,2,3,6-tetrahydrophthalic acid anhydride; and 4-phenyl-5-tert-butyl-3-hydroxy-1,2,3,6-tetrahydrophthalic acid from 3-cyclohexanoxy-4-phenyl-5-tert-butyl-1,2,3,6-tetrahydrophthalic acid.

*Example V*

3,5-dimethyl-1,2-dihydrophthalic acid was prepared by treating 3-acetoxy-3,5-dimethyl-1,2,3,6-tetrahydrophthalic acid, prepared as in Example I, with a 1 N aqueous sodium hydroxide solution. The hydrolytic reaction was carried out by dissolving the crude tetrahydrophthalic acid derivative in a solvent comprising dioxane and heating together with the 1 N caustic at a reflux temperature. The hydrolytic reaction product was then neutralized with acid and extracted with a solvent to isolate the pure 3,5-dimethyl-1,2-dihydrophthalic acid which melted at 200° C. to 203° C. and analyzed 61.1% C, 6.13% H (theory 60.6% C, 6.15% H). Its equivalent weight was found to be 98 (theory 101).

In a fashion similar to that described above for the preparation of 3,5-dimethyl-1,2-dihydrophthalic acid, are prepared 3-octyl-1,2-dihydrophthalic acid from 3-octyl-3-acetoxyl-1,2,3,6-tetrahydrophthalic acid anhydride; 3-tert-butyl 1,2-dihydrophthalic acid from 3-tert-butyl-3-acetoxy - 1,2,3,6-tetrahydrophthalic acid anhydride; 5-methyl-3-ethyl-1,2-dihydrophthalic acid from 3-acetoxy-3-ethyl-5-methyl-1,2,3,6-tetrahydrophthalic acid anhydride; 1,2,3,6-trimethyl-1,2-dihydrophthalic acid from 1,2,3-trimethyl-3-acetoxy-1,2,3,6-tetrahydrophthalic acid anhydride; 3,4-dipentyl-1,2-dihydrophthalic acid from 3,4-dipentyl - 3 - acetoxy - 1,2,3,6-tetrahydrophthalic acid anhydride; and 3,5,6-trimethyl-1,2-dihydrophthalic acid from 3,5,6-trimethyl-3-acetoxy-1,2,3,6-tetrahydrophthalic acid anhydride.

The process of the invention, thus, provides a ready method for preparing a wide variety of 3-acyloxy - 1,2,3,6 - tetrahydrophthalic acid anhydrides and their hydrolytic products which are useful in a variety of applications. 3-acetoxy-3,5-dimethyl-1,2,3,6-tetrahydrophthalic acid and its anhydride are, for example, useful in any capacity where a slow liberation of free acetic acid is required. This use is made possible by the fact that the acetate group is a tertiary ester group which is readily hydrolyzed to form free acetic acid and a hydroxy - substituted tetrahydrophthalic acid. These compounds are, therefore, useful insecticides, their insecticidal activity being due to the fact that they are readily hydrolyzed to liberate a free organic acid. Certain of the esters, e. g. diallyl esters of the tetrahydrophthalic acids of the invention, are also useful insecticidal toxicants. Other esters such as the unsaturated esters are useful as resin intermediates while esters such as the dibutyl esters are useful as plasticizers, particularly for vinyl resins and polyallyl-type resins, and also as rubber softeners and retarders. The compounds of the invention are extremely valuable intermediates in the synthesis of other useful organic compounds because of the relatively large number of substituent groups which are present within their molecular structure. In addition to their use in the preparation of the hereinabove described hydrolytic products and in the preparation of a wide variety of esters they may be hydrogenated to form useful cyclohexene derivatives, dehydrogenated to form phthalic acid derivatives useful for a wide variety of purposes and halogenated by reaction a free halogen such as chlorine or bromine to form halogen-containing compounds which are of value, for example, as insecticides, solvents, resin intermediates, etc.

We claim as our invention:

1. 3 - acetoxy-3, 5-dimethyl-1,2,3,6-tetrahydrophthalic acid anhydride.
2. 3 - methyl - 3 - acetoxy - 1,2,3,6-tetrahydrophthalic acid anhydride.
3. A process for the production of 3-acetoxy-3,5-dimethyl-1,2,3,6-tetrahydrophthalic acid anhydride which comprises reacting mesityl acetate with an approximately equivalent amount of maleic anhydride at a temperature between about 30° C. and 100° C.
4. A process for the production of 3-acyloxy-1,2,3,6-tetrahydrophthalic acid anhydrides which comprises condensing an open-chain doubly unsaturated ester of the formula:

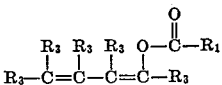

wherein $R_1$ is a hydrocarbon radical and each $R_3$ is a member of the group consisting of hydrogen, halogen, alkyl radicals, —OR radicals and

radicals wherein R is an alkyl radical with an approximately chemical equivalent amount of a member of the group consisting of maleic anhydride and the substituted maleic anhydrides wherein at least one of the hydrogen atoms joined to the carbon atoms bearing the olefinic linkage has been replaced by an alkyl radical.

5. A process for the production of 3-acyloxy-1,2,3,6-tetrahydrophthalic acids which comprises condensing an open-chain, doubly unsaturated ester of the formula:

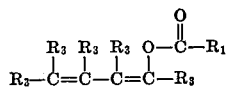

wherein $R_1$ is a hydrocarbon radical and each $R_3$ is a member of the group consisting of hydrogen, halogen, alkyl radicals, —OR radicals and

radicals wherein R is an alkyl radical with an approximately chemical equivalent amount of a member of the group consisting of maleic anhydride and the substituted maleic anhydrides wherein at least one of the hydrogen atoms joined to the carbon atoms bearing the olefinic linkage has been replaced by an alkyl radical, and hydrolyzing the resulting product with a dilute aqueous solution of a basic substance.

6. A 3 - acetoxy-3,5-dialkyl-1,2,3,6-tetrahydrophthalic acid anhydride.
7. A 3-alkanoxy-3,5-dialkyl-1,2,3,6-tetrahydrophthalic acid anhydride.
8. A 3 - alkanoxy - 3 - alkyl-1,2,3,6-tetrahydrophthalic acid anhydride.
9. A compound of the group consisting of (1) anhydrides of the formula

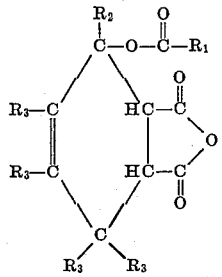

wherein $R_1$ is a hydrocarbon radical, $R_2$ is an alkyl radical and $R_3$ is a member of the group consisting of hydrogen, halogen, alkyl radicals, —OR radicals and

radicals wherein R is an alkyl radical, and (2) acids derived from the aforedescribed anhydrides by hydrolyzing the anhydride group.

HARRY DE V. FINCH.
SEAVER A. BALLARD.

REFERENCES CITED

The following references are of record in the file of this patent:

FOREIGN PATENTS

| Number | Country | Date |
| --- | --- | --- |
| 739,438 | Germany | Sept. 28, 1943 |

OTHER REFERENCES

Pasquinelli: Chemical Abstracts, vol. 38, p. 5734, (1943).

Liebig's "Annalen de Chemie," vol. 551 (1942), pp. 21, 22, 23, 59 and 60.